United States Patent [19]
Peavey et al.

[11] Patent Number: 5,323,167
[45] Date of Patent: Jun. 21, 1994

[54] ANTENNA CONFIGURATION AND SYSTEM FOR DETERMINING THE DIRECTION OF A RADIO FREQUENCY SIGNAL

[75] Inventors: David L. Peavey, St. Fremont; Katherine A. Tieszen, Cupertino; Timothy D. Stephens, Milpitas; Thomas J. Birnbaum, Scotts Valley; Fred E. Schader, San Jose; Nicholas Cianos, Menlo Park; John R. Conkle, Los Gatos, all of Calif.

[73] Assignee: Delfin Systems, Santa Clara, Calif.

[21] Appl. No.: 998,390

[22] Filed: Dec. 30, 1992

[51] Int. Cl.$^5$ .............................................. G01S 5/02
[52] U.S. Cl. .................................. 342/429; 342/448; 342/433
[58] Field of Search ....................... 342/448, 429, 433

[56] References Cited
U.S. PATENT DOCUMENTS 4,489,327 12/1984 Eastwell ............................. 342/432
4,635,065 1/1987 Mori et al. .......................... 342/435

Primary Examiner—Theodore M. Blum
Attorney, Agent, or Firm—Benman Collins & Sawyer

[57] ABSTRACT

An antenna configuration system for determining the bearing angle of a radio frequency signal includes a plurality of loop antennas and at least one sense antenna. Through the utilization of combining networks with the loop antennas, in-phase and out-of-phase output signals are summed with the signal from the one sense antenna. The summed signal is sent to an adaptive processing system to allow for the determination the bearing angle of the radio frequency signal.

13 Claims, 7 Drawing Sheets

100

ANTENNA CONFIGURATION AND SYSTEM FOR DETERMINING THE DIRECTION OF A RADIO FREQUENCY SIGNAL

FIELD OF THE INVENTION

The present invention is directed toward a method, and apparatus for determining the direction of a radio frequency (RF) signal and more particularly to a system that utilizes an improved antenna configuration for determining an RF signal.

BACKGROUND OF THE INVENTION

The direction finding systems of today owe much to concepts related to radio direction finding learned over the first half of this century. However, over the past two decades, relatively inexpensively analog and digital processing tools have lead to the development of high performance, easy to use, direction finding devices that are viable for many applications.

While these new tools are derived from advances in commercial digital signal processing (DSP), there are technologies unique to direction finding (DF) systems that are of significant importance to such systems. The design of a complete DF system requires careful consideration of many factors ranging from frequency, propagation, and modulation to application and deployment. However, the most important direction finding fundamental is the method used to intercept and locate signals of interest (SOI).

As with any radio frequency signal intercepting system, the receivers and detectors are optimized for the particular signals of interest. In such systems certain design performance requirements such as size, weight and power are balanced against the key systems specifications: selectivity and sensitivity. One of the most critical parameters to be influenced by DSP functions are the computation of the bearing angle of the signal. The present patent application is directed towards influencing the computation of bearing angles. DSP plays a major role in improvement of the signal to noise ratio and computation of the quality factors, an indication of the effectiveness of the bearing measurement. Processing also considers calibration issues. Specifically, various antenna and equipment calibration methods use DSP to achieve and maintain the desired measurement accuracies on the order of a few degrees of true compass headings.

Finally, the DF system processor provides the man-machine interface. With new digital display technology, many additional capabilities have been added to the design of today's direction finding systems.

The functional features of the system include intercept search speed and operational performance as well as adaptability of the equipment to multiple applications. There are many types of advanced processing procedures and functions associated with DSP systems. In addition, these performance characteristics improve the direction finding systems.

However, the performance of even the latest direction finding systems is ultimately affected by the law of physics. The chance location of the direction finding (DF) equipment at a field site or on a platform may result in significant measurement errors. In some cases the deleterious effects of the site or platform can be mitigated either by moving the location or calibrating the error into the calculation.

In antenna array sampling techniques, various methods are used to achieve affordable multi-application system designs. These sampling methods determine the bearing angle of the radio signal so that the proper signal can be found.

Antenna array sampling methods, like those used in current pseudo-Doppler DF, are an attractive way of achieving affordable multi-application system designs. When combined with the latest signal processing methods and low-cost processors, array sampling techniques offer benefits that are comparable to earlier, very expensive system approaches.

DF antennas have aperture dimensions that are typically small, most less than half a wavelength. Today's electromagnetic modeling and computer-aided design tools allow engineers to design antennas that are relatively small and efficient over wide spectral bands. But the small aperture size of the antennas would make turning or steering techniques an ineffective means to locate the arriving signal bearing. Instead, three fundamental measurement parameters are used; amplitude, phase and Doppler frequency.

In the amplitude measurements, two sets of antennas with dipole-type patterns are arranged orthogonally. Signals arriving at the two antennas induce a voltage relative to the polarization and radiation pattern for each antenna. The bearing angle is derived from the ratio of the two signal amplitudes. Because simple amplitude measurements are made, a sense antenna (with an omni-directional pattern) is used to resolve the "180 degree" ambiguity in the bearing calculation.

Direct phase measurement methods for example, use a set of four antennas. Two antennas form one baseline. The relative phase differences of the induced voltages between the antennas define the bearing angles. Ambiguity in the bearing measurements, therefore, is not an issue.

Conceptually, at least, the Doppler measurement methods are straightforward. A antenna is rotated about a point at a given angular rate. As the antenna moves, it imposes a Doppler shift on the arriving signal. The magnitude of the Doppler shift is at a maximum as the antenna moves directly toward and away from the direction of the incoming wavefront. There is no apparent frequency shift when the antenna moves orthogonally to the wavefront. The bearing angle is therefore proportional to the relative position of the zero crossings of the Doppler-shifted signal. For many applications Doppler methods are not practical, since the system uses motors and moving components.

Although the amplitude and phase measurement methods are viable DF approaches, they too have some significant constraints. First, they must maintain amplitude and phase balance to minimize measurement errors. Maintaining amplitude and phase balance is especially challenging when the antennas are connected to the processor through the multiple amplitude-phase matched receivers and cable assemblies still used in older system architectures. The antennas and receivers are significantly more expensive as well. Add these factors to the complexity of the overall DF system design and the antenna array continues to be the major focus for new design challenges.

Computer and RF technology advances over the past 20 years have resulted in new tools and devices to create systems with a single receiver. Using one receiver in a system reduces the balancing errors, overcomes the Complexities of amplitude-phase matched receivers and substantially reduces system cost. Hence, the system becomes more affordable.

There are various ways of designing a DF system with a single receiver, such as the RF combining subsystem approach. In this design, RF processing elements combine the outputs of the antenna elements and feed the combined RF output signal to a single receiver and DF processor.

An alternative approach uses RF sampling methods from an array of antennas. Here, an RF sampling (or commutating) switch samples each antenna and sends the combined samples to the receiver and DF processor. This sampling method simplifies the design of the antenna electronics and further reduces design complexity.

Different types of antenna arrangements can be utilized for finding the direction of an RF signal. Simple whips and/or dipole antennas are used to determine direction however, they have several disadvantages. For example, at lower frequencies the wavelengths are very long. Correspondingly, the longer the wavelength the longer the antenna. In some low frequency applications utilizing whip antennas they can be as long as eight (8) feet. This makes for a unwieldy df system in many instances.

In addition, in most applications a plurality of the whip antennas are arranged in a circular pattern. At low frequencies, the antennas must be positioned over a large diameter to be effectively utilized for direction finding.

Cross looped antennas have been utilized extensively for direction finding to improve the accuracy. It is known that at lower frequencies these types of antennas are much smaller than whip or dipole antennas. These antennas in the prior art typically require fairly complicated circuitry to accurately provide a sampled RF signal. These alternate approaches oftentimes required separate receivers for each of the antennas. Thereafter, the outputs of these separate signals were combined at a combining network. Typically, these types of arrangements were very complex and extremely costly.

The present invention is directed to a direction finding apparatus which is simpler and less expensive, than previously known systems that utilized cross looped and/or orthogonal antenna arrangements.

SUMMARY OF THE INVENTION

A system for determining the direction of a radio frequency (RF) signal, the system including at least two loop antennas and at least one sense antenna receiving the RF signal; the system comprising means coupled to one of at least two loop antennas for providing two output signals; one of the output signals being in phase with the RF signals and one of the output signals being 180° out of phase with the RF signal; means for commutating between the output signals, the commutating means first sampling in phase output signals and then sampling the output phase output signals; and means for summing the sampled output signals with an output signal from the sense antenna.

DETAILED DESCRIPTION OF THE INVENTION

The present invention relates to systems for determining the direction of a radio frequency (RF) signal. The following description is presented to enable one of ordinary skill in the art to make and use the invention and is provided in the context of a patent application and its requirements. Various modifications to the preferred embodiment will be readily apparent to those skilled in the art and the generic principles defined herein may be applied to other embodiments.

Thus, the present invention is not intended to be limited to the embodiment shown but is to be accorded the widest scope consistent with the principles and features described herein.

Figure 1:
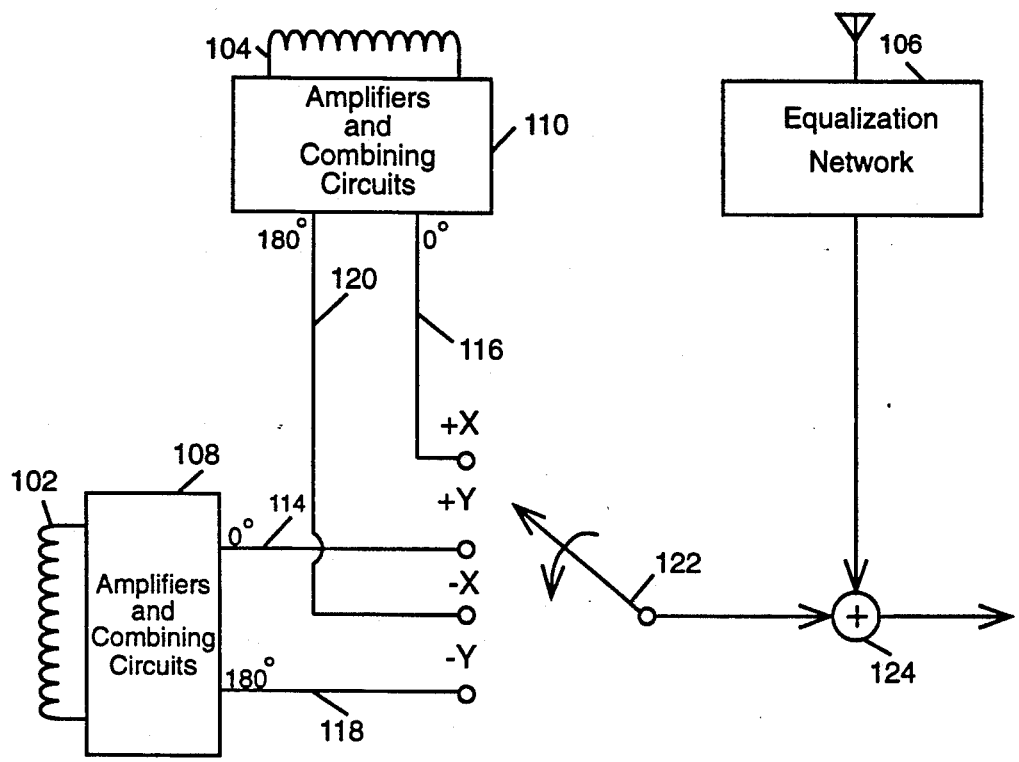
FIG. 1 shows a simple block diagram of an antenna configuration in accordance with the present invention.

As has been before mentioned, cross loop antennas have been utilized extensively in direction finding systems. FIG. 1 shows a system 100 shows an antenna configuration system in accordance with the present invention. The system 100 includes first and second loop antennas 102 and 104 respectively and a sense antenna 106. The first loop antenna 102 is coupled to amplifier and combining network 108. The second loop antenna 104 is coupled to amplifier and combining network 110. The sense antenna 106 is coupled to an equalizer network 112. There are two outputs of networks 108 and 110. One of the output signals 114 and 116 of the networks 108 and 110 respectively is the in phase component of the RF signal. The other of the output signals 118 and 120 of the networks 108 and 110 respectively is the output of phase (180°) signal. Commutating switch 122, switches between the different signals 114, 116, 118 and 120. The output of switch 122 is provided to summer 124 along with the output of the equalization network 112. The output of the summer 124 provides the sampled RF output signal that can then be utilized to determine the bearing angle of the RF signal.

In such a system, it can be shown mathematically that the switching components of these antennas have the form of $$\sin(2\pi ft) + A\cos\phi\cos(2\pi ft)$$

$$\sin(2\pi ft) + A\sin\phi\cos(2\pi ft)$$

$$\sin(2\pi ft) - A\cos\phi\cos(2\pi ft)$$

$$\sin(2\pi ft) - A\sin\phi\cos(2\pi ft)$$

where $\phi$ represents the direction of arrival of the signal of interest and A is an amplitude level of the signal of interest relative to the reference level. In this two loop antennas-one sense antenna arrangement, the sense antenna 106 provides a reference signal that has an in-phase component $\sin 2\pi f$ and an out of phase component $\cos 2\pi f$. Each directional components ($\cos\phi$ and $\sin\phi$) represent the amplitude of the dipole pattern of the loop antennas 102 and 104. This relationship can also be expressed mathematically as:

$$\sqrt{1 + A^2\cos^2\phi} \ \cos(2\pi ft - \tan^{-1}(1/A\cos\phi))$$

$$\sqrt{1 + A^2\sin^2\phi} \ \cos(2\pi ft - \tan^{-1}(1/A\sin\phi))$$

$$\sqrt{1 + A^2\cos^2\phi} \ \cos(2\pi ft + \tan^{-1}(1/A\cos\phi))$$

$$\sqrt{1 + A^2\sin^2\phi} \ \cos(2\pi ft + \tan^{-1}(1/A\sin\phi))$$

Hence, with a set of phase measurements the amplitude levels of the received signals corresponding to the phase measurements is immediately obtained. Therefore, the complexity of the electronics for direction finding is significantly reduced.

When sample measurements are made on these types of antennas, phase and amplitude changes occur as the signal switches from one antenna to another. Although an amplitude detector and its corresponding feedback path can be used, a more straight forward approach can be taken that gets around the amplitude measurement. Specifically, for these types of antenna configurations, a unique relationship exists between the amplitude and phase measurements. Making use of the relationship reduces much of the complexity of the computations. To more particularly explain this feature refer now to the following discussion.

Figure 2:
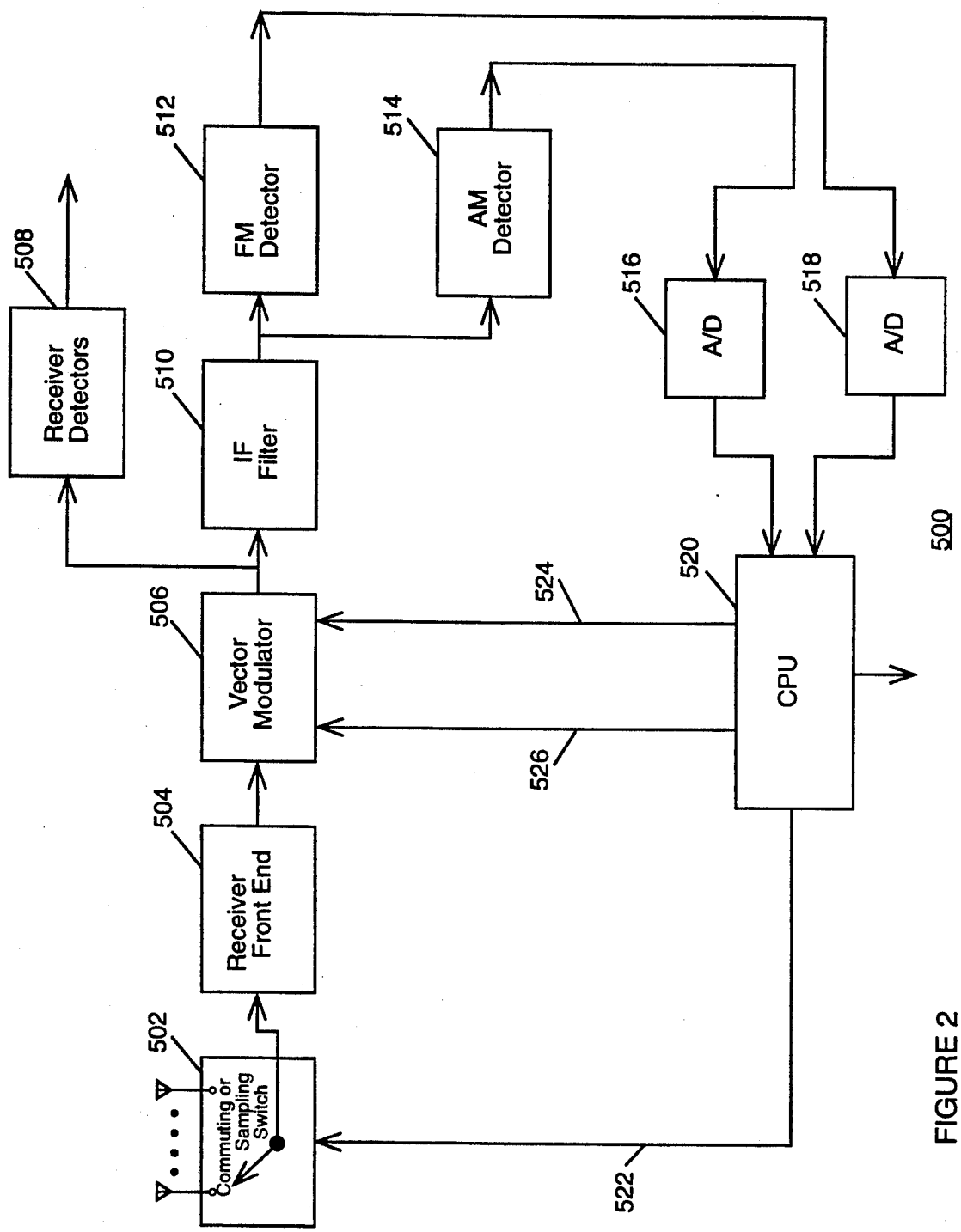
FIG. 2 is a detailed block diagram of an adaptive interferometric processor system in accordance with the present invention.

Referring now to FIG. 2, what is shown is a detailed block diagram of an AIP DF system 500 in accordance with the present invention. DF system 500 includes an array of antenna elements 501 and a sampling switch 502. The switch 502 output is coupled to a receiver front end 504 and provides a sampled RF signal thereto. The output of receiver front end 504 is a sampled IF signal. This output signal is provided to a vector modulator 506. The output of the vector modulator 506 (a processed IF signal) is provided to receiver detector 508 and IF filter 510. The signal from the IF filter 510 is provided to frequency modulation (FM) detector 510 and amplitude modulation (AM) detector 514. The output of receiver/detector 508 is provided to an audio detector or speaker (not shown).

The output of the FM detector 512 is provided to the input of analog to digital (A/D) converter 518. The output of the AM detector is provided to A/D converter 516. The outputs of A/D converters 516 and 518 are provided to central processing unit (CPU) 520. The CPU 520 provides signals via lines 526 and 528 to the vector modulator 506. The CPU also controls switch 502 via line 522.

The DF system 500 operates in the following manner.

The commutating or RF sampling switch 502 samples the antenna elements 501 of the DF array. A switch control line 522 provides the control signal from the CPU 520 to the sampling switch. The CPU 520 can select the antenna elements 501 in any prescribed manner.

The output of the commutating switch 502 is an RF sampled signal. The sampled signal goes to the receiver 502 input. The receiver 502 converts the radio frequency signal to an intermediate frequency (IF).

The original sampled RF signal now appears as a sampled IF signal. The sampled IF signal is provided to the vector modulator 506. The vector modulator 506 adjusts the amplitude and phase of the IF sampled signals. The amplitude and phase adjustments ($\Delta G$ and $\Delta\phi$) are determined by an adaptive interferometric process.

The sampling process imposes a commutation induced phase and amplitude modulation on the RF signal. This modulation correspondingly appears on the IF signal. The amplitude and phase adjustments are selected by the CPU 520 to suppress or null out the effects of the switch induced modulation. Hence, the output of the vector modulator 506 is nearly identical to the original signal without the switch induced modulation components.

The nulled or processed IF signal is provided to two portions of the system 500. The one output is provided to the receiver 508 where the signal is detected with standard detectors. The detected output provides the audio signal that an equipment operator can listen to. It should be noted that the sampled detected IF signal is not very intelligible while the processed IF signal is intelligible.

The second output of the vector modulator 506 is provided through a feedback loop that is part of the adaptive processing element of the system 100. The elements of the feedback loop include an IF filter 510, FM detector 512, AM detector 514, A/D convertors 516 and 518 and the CPU 520 processor.

The IF filter 510 bandwidth is comparable to the bandwidth of the filter(s) (not shown) within the receiver detector 508. The IF filter 510 output is provided to two detectors, AM detector 514 and an FM detector 512. The AM detector 514 measures the amplitude changes of signal and the FM detector 512 measures frequency and hence the phase of the signal.

It should be noted that the FM detector 512 provides the phase change measurement due to the relationship of frequency and phase of a signal. In fact, however, FM detector 512 is measuring frequency. In so doing, phase comparisons that are traditionally used in prior art techniques, are not needed.

For example, it is known that one way to perform phase measurements is to use a phase meter. In this type of arrangement, a reference signal is provided that is compared to the phase of the signal of interest. In this present invention, a change in phase is measured, thereby greatly simplifying the measurements. Within the feedback loop, those detected outputs provide the error signals that are used within the Adaptive Interferometric Process (AIP). The specific signals measured are the induced modulation components from the commutating switch 502.

Both the AM and FM outputs are analog signals. The analog signals are then converted into digital signals with the use of analog-to-digital converters 516 and 518, respectively. From the digital signals CPU 520 in conjunction with internal algorithms, it generates amplitude or gain and phase adjustments, $\Delta G$ and $\Delta\phi$. As noted before, those adjustments are provided to the vector modulator 506. The CPU 520 is typically a general purpose computer used to control and operate the system. After the CPU computes $\Delta G$ and $\Delta\phi$, it then computes the DF bearing angle of the signal of interest.

Figure 3:
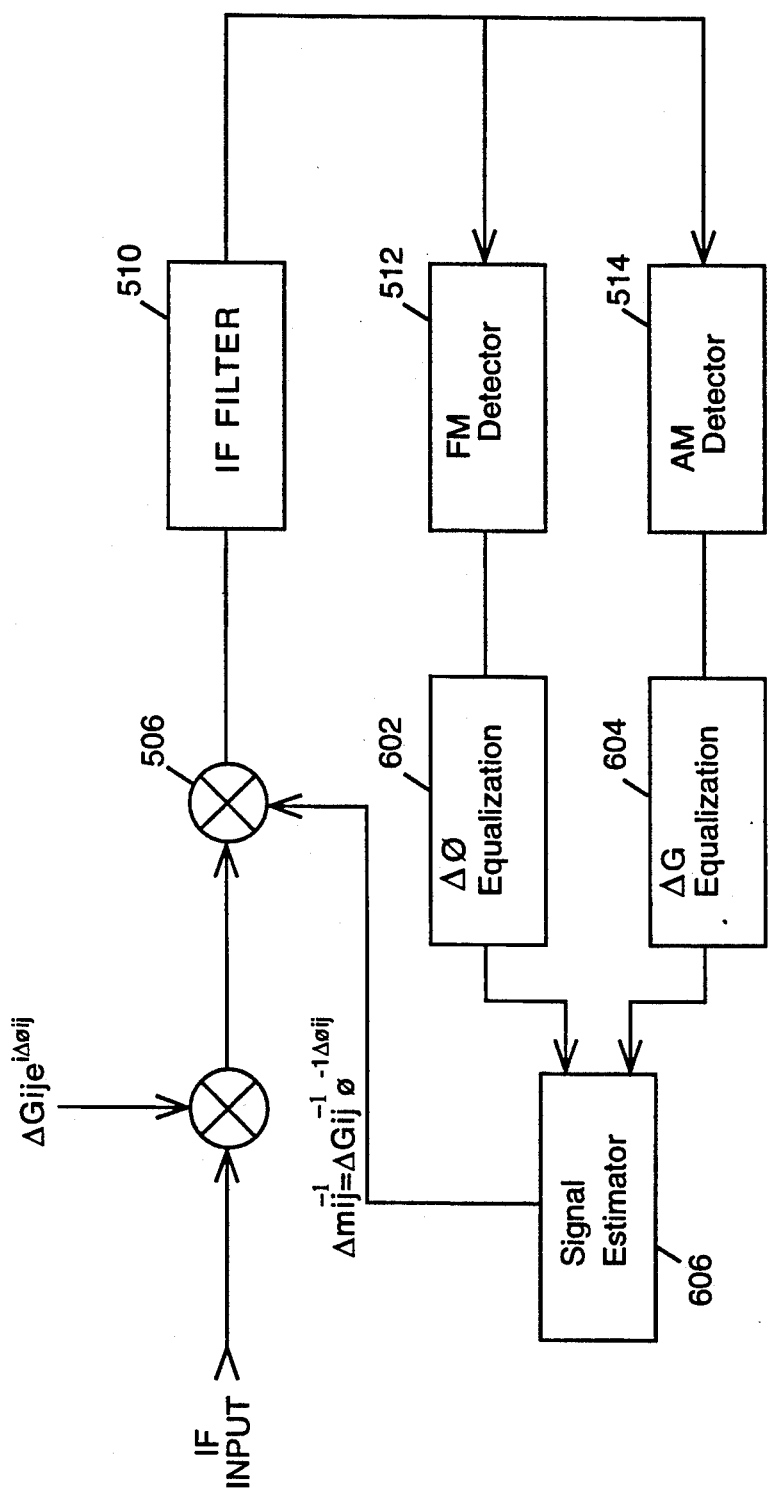
FIG. 3 is a signal flow description of the hardware block diagram of FIG. 3 in accordance with the present invention.

To more fully explain the present invention refer now to FIG. 3. FIGS. 3 shows the signal flow associated with the hardware block diagram of FIG. 2.

As noted before hand, the commutating switch 502 (FIG. 3) imposes amplitude and phase ($\Delta G_{ij}$ and $\Delta\phi_{ij}$) changes on the incoming signal. This modulated signal passes to the vector modulator 506. A signal $\Delta \overline{M}_{ij}^{-1}$ from the feedback loop is multiplied by the signal, $\Delta M_{ij}$, from the communication process. $\Delta \tilde{M}ij$ is approximately equal to the reciprocal of $\Delta \tilde{M}ij^{-1}$. Hence, the product is approximately unity which corresponds to the nulling out of modulation components from the commutating switch 502.

As noted before, the signal output of the vector modulator 506 is provided to the FM and AM detectors 512 and 514 which generate error signals through equalization components 602 and 604 respectively. The outputs of the equalizers 602 and 604 are provided to the signal estimator 606 which generates the estimate of the switch modulated component $\Delta Mij$.

Figure 4A:
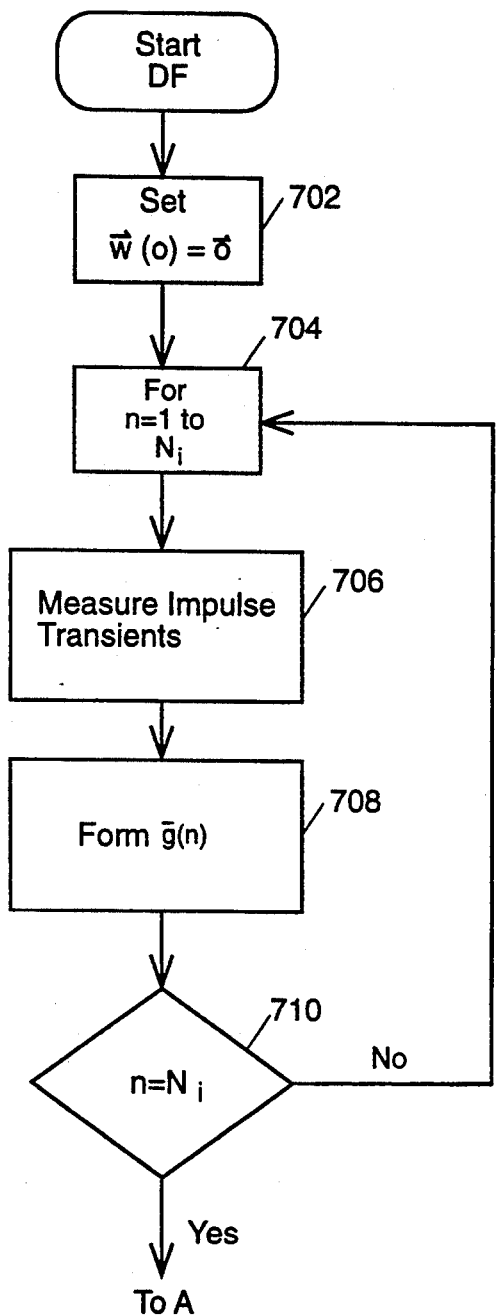
FIGS. 4 and 5 are flow charts showing the operation of an adaptive processing algorithm in accordance with the present invention in which the antennas cross loop or horizontal dipole antennas.
Figure 4B:
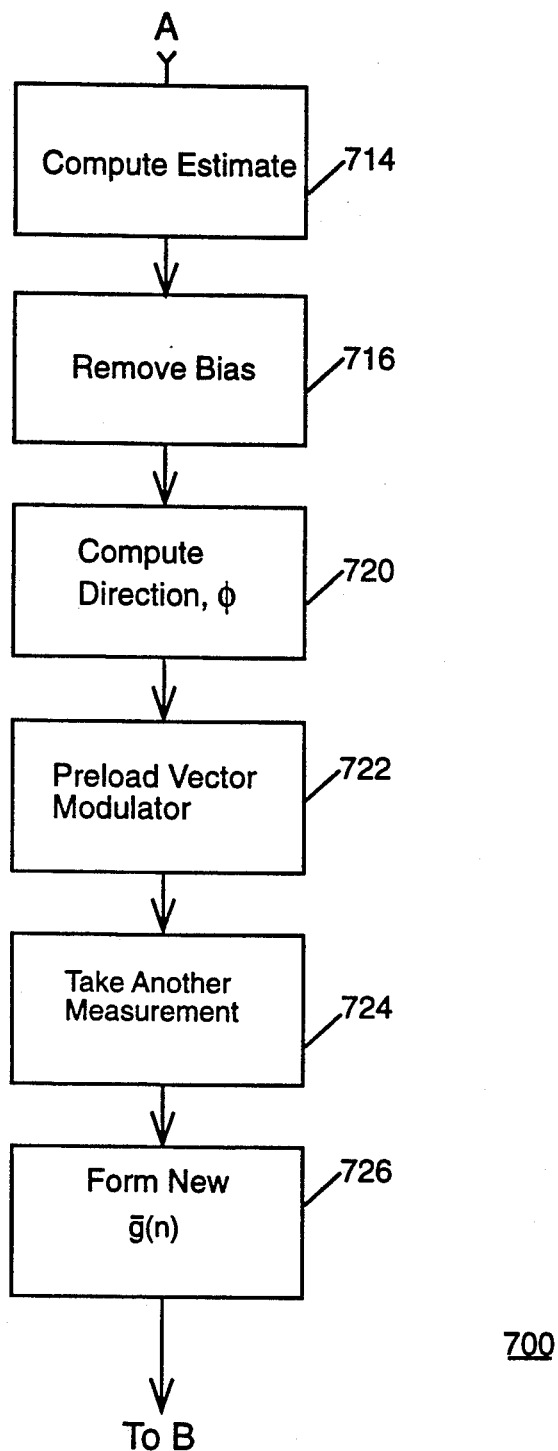
Figure 4C:
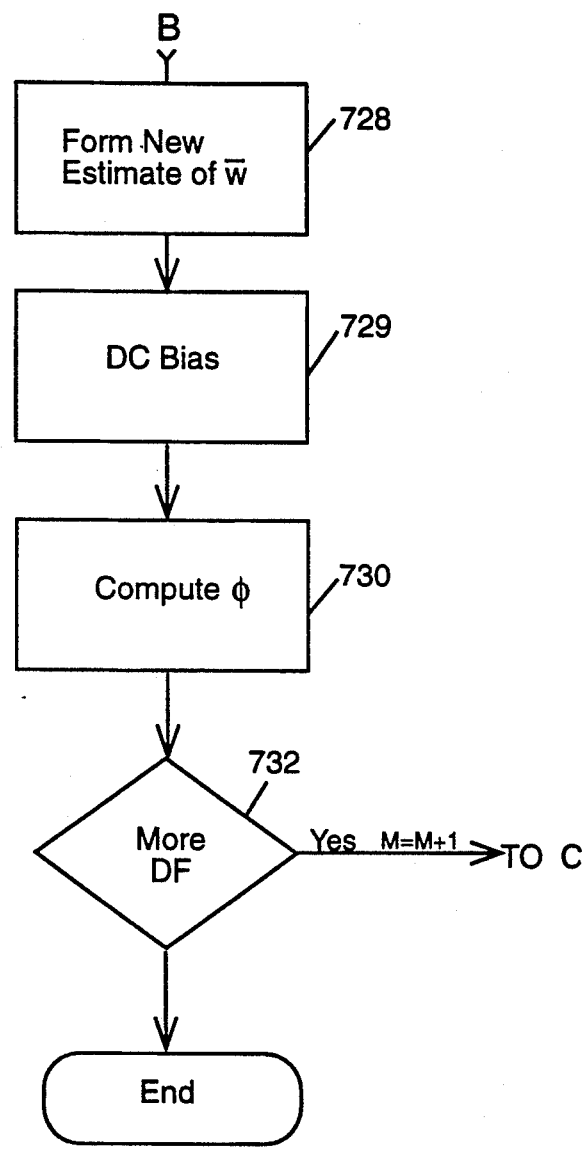

The CPU 520 in a preferred embodiment provides these components through an adaptive processing algorithm which will null out the modulation components of the signal. It is well recognized by one of ordinary skill in the art that this algorithm can be implemented in many ways within CPU 520 and that implementation would be within the spirit and scope of the present invention. To more fully understand such an algorithm refer now to FIGS. 4 and 5.

When the DF process is activated, the setting of the antenna elements ($\vec{W}(o) = \vec{0}$) is initialized (block 702). Therefore, the last antenna in the sequence is selected.

With the commutating switch sampling the antennas, take $N_i$ initial measurements from $N_a$ antennas (block 704). Note that i represents the ith antenna element in a rotation. The measurements correspond to the impulse transients, $g_i(n)$ as the switch moves from one antenna to the next (block 706). The vector of the measurements is:

$$\vec{g}(n) = \begin{bmatrix} g_1(n) \\ g_2(n) \\ \cdot \\ \cdot \\ \cdot \\ g_{Na}(n) \end{bmatrix}$$

where n is the rotation number (block 708). If $n < N_i$ (block 710) then the steps of blocks 702 through 706 are repeated. If $n = N_i$, then compute an estimate or average of $\vec{g}$ (n) where the estimate is:

$$\vec{W}(n) = \frac{1}{N_1} \sum_{n=1}^{N_i} \vec{g}(n) \text{(block 714)}$$

This computation may include a bias or D.C. offset term. The D.C. offset results from tuning errors. Thereafter the bias term is removed.

The following mathematical expression describes this removal:

$$\vec{W}(n) = \vec{W}(n) - \vec{W}^T(n) \cdot \vec{1}/N_a$$

where $\vec{W}^T(n)$ is the transpose of $\vec{W}(n)$ and 1 is the unit vector. (block 716)

From the unbiased term, the direction of arrival, $\phi$, is computed by taking the Fourier Transform of $\vec{W}'(n)$. (block 720). Note that $\phi$ is the angle of the first sinusoidal component.

Thereafter the vector modulator 506, FIG. 3 is preloaded with $w_{Na}(n)$. The term $W_{Na}$ is the $N_a$ the element of the vector W (block 722)

Thereafter another set of measurements is taken:

$$n = n + 1$$

and the vector modulator 506 is loaded with $-w_i(n)$, the ith element, at the same instant the antenna is switched (block 718), and $i = 1$ to $N_a$. As the measurements are made new measurement vector g(n) is formed (block 726).

Thereafter, the previous estimate of $W'(n-1)$ and the new measurement value, g(n), are utilized to estimate a new value of $W'(n)$. Specifically, $$\vec{w}(n) = \alpha \vec{W}'(n-1) + \mu \vec{g}(n)$$

which is a form of a leaky integrator. The terms $\alpha$ and $\mu$ are the adaptive coefficients that set the integration and decay time constants (block 728). As above, remove the D.C. bias term again, Using the new estimate of $\vec{W}'(n)$, the direction bearing angle, $\phi$, is computed where $\phi$ is the Fourier Transform of W (block 730).

Figure 5:
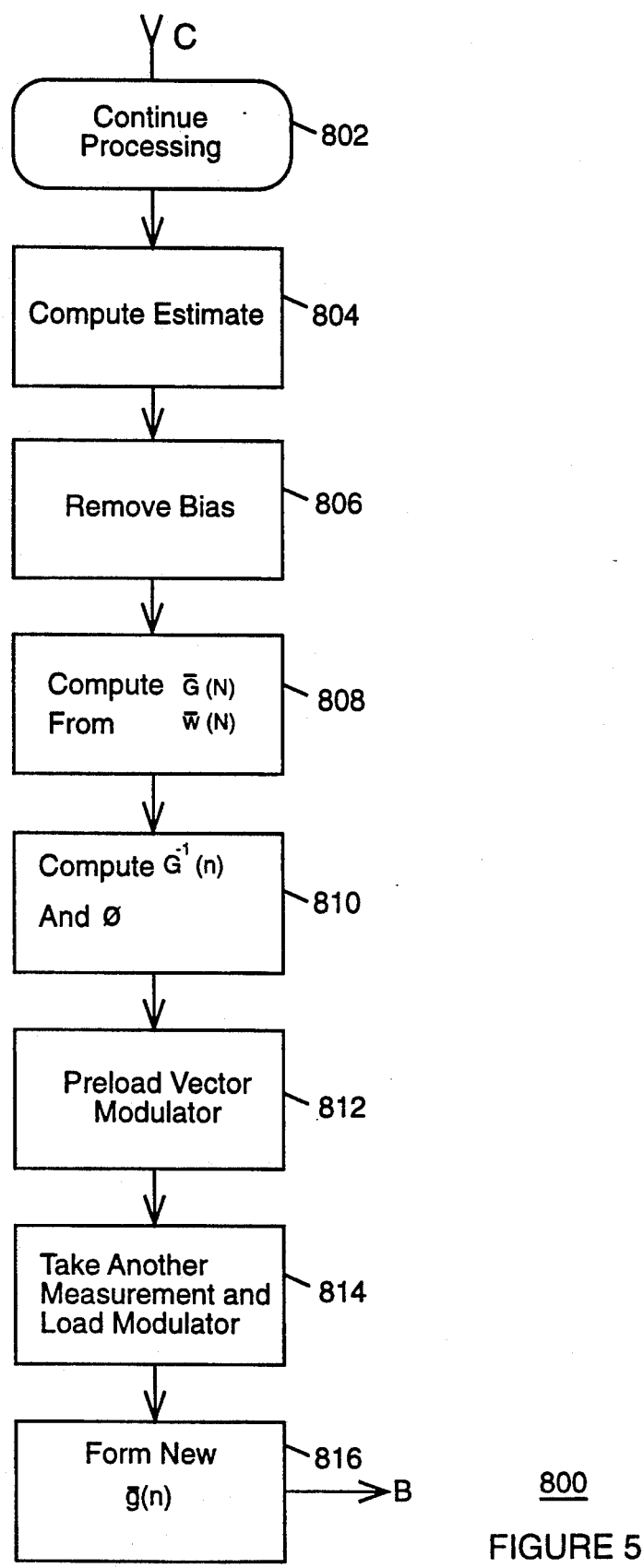

Thereafter, referring now to FIG. 5, using the phase estimates $\vec{w}(n)$, the corresponding amplitude estimate $\vec{G}(n)$ can be derived. Thus, $\vec{W}(n)$ provides $\vec{G}(n)$, (block 808)

Then vector modulator 506 is preloaded with the inverse of the amplitude estimate $G_{Na}^{-1}(n)$. (block 812)

Therefore, in this embodiment only measurements from the FM detector need to be utilized since the phase measurements from the FM detector are used to derive the amplitude measurements.

Then steps of blocks 814–816 are implemented. Thereafter, referring back to FIG. 4, blocks 728–732 are repeated until the bearing angle is determined. Therefore, the amplitude measurement is not needed and the computation is greatly simplified.

Although the present invention has been described in accordance with the embodiments shown in the figures, one of ordinary skill in the art would readily recognize that there could be variations to those embodiments and those variations of the present invention. It should be understood that although this system was shown for two loop antennas and one sense antenna, a different number could be used. Accordingly, many modifications may be made by one of ordinary skill in the art without departing from the spirit of the present invention, the scope of which is defined solely by the appended claims.

We claim:

1. A system for determining the bearing angle of a frequency (RF) signal comprising:
   an antenna system;
   the antenna system further comprising:
   at least one sense antenna for receiving the RF signal;
   a plurality of loop antennas for receiving the RF signal;
   a plurality of means for providing two output signals;
   one of the plurality of providing means being coupled to one of the plurality of loop antennas;
   means for commutating between the plurality of output signals providing means to provide a summed and sampled RF signal, the commutating means providing commutation induced phase and amplitude modulation to the RF signal; and
   a processor system, the processor system further comprising:
   means for converting the sampled and modulated RF signal to an intermediate frequency (IF) signal, the IF signal including the commutation induced phase and amplitude modulation;

means for detecting the IF signal; and means responsive to the detecting means for removing the commutation induced phase and amplitude modulation from the IF signal whereby the bearing angle of the RF signal is determined.

2. The system of claim 1 in which one of the two output signals of the providing means is in phase with the RF signal and the other of the two output signals is out of phase with the RF signal.

3. The system of claim 2 in which the commutating means first samples the phase output signals and then samples the out of phase output signals.

4. The system of claim 1 which further comprises: means for receiving the IF signal from the converting means and providing an audio output signal representative of the IF signal without the commutation induced phase and amplitude modulation.

5. The system of claim 1 which further comprises: means for filtering the IF signal and providing detected frequency modulation (FM) signals and amplitude modulation (AM) signals.

6. The system of claim 5 which further comprises: means for detecting the FM signals; and means for detecting the AM signals.

7. The system of claim 6 which further comprises: means for converting the FM signal to a first digital signals; and means for converting the AM signal to a second digital signal; the first and second digitals being provided to a controlling means.

8. The system of claim 7 in which the controlling means comprises a central processing unit (CPU).

9. The system of claim 8 in which the central processing unit (CPU) responsive to the first and second signals for providing amplitude and phase adjustments to null out effects of the modulation caused by the commutating means.

10. The system of claim 1 in which the detecting means detects a change in frequency of the IF signal utilizing the commutation phase and amplitude induced modulation, provides that frequency change to the removing means and the removing means responsive to the frequency change provides the inverse of that frequency change to the modulating means thereby cancelling the commutation induced phase and modulation in the IF signal.

11. The system of claim 1 in which the detecting means tracks the IF signal utilizing the commutation phase and amplitude induced modulation, provides that tracking to the removing means and the removing means responsive to the tracking provides an indication of the tracking to the modulating means thereby cancelling the commutation induced phase and modulation in the IF signal.

12. An apparatus for determining the bearing angle of a radio frequency (RF) signal comprising:

at least one sense antenna for receiving the RF signal;

a plurality of loop antennas for receiving the RF signals;

a switch for commutating between the plurality of loop antennas to provide a sampled RF signal, the switch providing commutation induced phase and amplitude modulation to the RF signal;

a vector modulation means for modulating the sampled and modulated RF signals from the at least one sense antenna element and the plurality of loop antennas to an intermediate frequency (IF) signal, the IF signal including the commutation induced phase and amplitude modulation;

means for detecting the IF signal; and a processor responsive to the detecting means for adaptively removing the commutation induced phase and amplitude modulation from the IF signal whereby the bearing angle of the RF signal is determined.

13. The apparatus of claim 11 which further comprises:

a detector for receiving the IF signal from the converting means and providing an audio output signal representative of the IF signal without the commutation induced phase and amplitude modulation.

* * * * *